United States Patent
Anger et al.

(10) Patent No.: US 10,880,237 B2
(45) Date of Patent: Dec. 29, 2020

(54) METHODS AND SYSTEMS FOR RANKING MESSAGING BOTS

(71) Applicant: Facebook, Inc., Menlo Park, CA (US)

(72) Inventors: Matthew Robert Anger, San Francisco, CA (US); Tsung-Chuan Chen, Palo Alto, CA (US); Chih Shao Lee, Sunnyvale, CA (US); Mikhail Larionov, Palo Alto, CA (US)

(73) Assignee: FACEBOOK, INC., Menlo Park, CA (US)

( * ) Notice: Subject to any disclaimer, the term of this patent is extended or adjusted under 35 U.S.C. 154(b) by 768 days.

(21) Appl. No.: 15/362,797

(22) Filed: Nov. 28, 2016

(65) Prior Publication Data
US 2018/0150524 A1    May 31, 2018

(51) Int. Cl.
G06F 16/9537    (2019.01)
H04L 12/58      (2006.01)
G06F 16/9535    (2019.01)
G06F 21/31      (2013.01)

(52) U.S. Cl.
CPC .......... H04L 51/02 (2013.01); G06F 16/9535 (2019.01); G06F 21/316 (2013.01)

(58) Field of Classification Search
None
See application file for complete search history.

(56) References Cited

U.S. PATENT DOCUMENTS

| 6,741,855 | B1 | 5/2004 | Martin et al. |
| 7,979,501 | B1 | 7/2011 | Coleman et al. |
| 8,166,120 | B2 | 4/2012 | Kunz et al. |
| 8,428,777 | B1* | 4/2013 | Poursohi .......... G05B 19/41865 700/247 |
| 8,539,361 | B2 | 9/2013 | Hardy et al. |
| 8,738,648 | B2 | 5/2014 | Denenberg et al. |
| 8,762,462 | B1 | 6/2014 | Duddu et al. |
| 8,769,414 | B2 | 7/2014 | Tsuei |
| 8,886,390 | B2* | 11/2014 | Wolfe .................. G06F 17/00 701/29.1 |
| 9,311,683 | B1* | 4/2016 | Saylor .................. H04L 67/22 |
| 9,411,506 | B1 | 8/2016 | Prado et al. |
| 9,450,901 | B1 | 9/2016 | Smullen et al. |

(Continued)

FOREIGN PATENT DOCUMENTS

KR    10-2015-0037804    4/2015

*Primary Examiner* — Mark D Featherstone
*Assistant Examiner* — Navneet Gmahl
(74) *Attorney, Agent, or Firm* — Kacvinsky Daisak Bluni PLLC

(57) ABSTRACT

Exemplary embodiments relate to techniques for identifying messaging robots, or bots, to surface in response to a request. For example, in order to facilitate increased interaction between a user and a bot, a list of candidate bots that the user is likely to be interested in may be surfaced to the user in response to a search for a bot or a request that a bot perform a particular task. Identifying the bots may be accomplished by generating a list of candidate bots and filtering the list based on filtering metrics. Then, the remaining bots may be ranked based on ranking metrics, and the top bots in the ranking may be returned. In some embodiments, two sets of ranks may calculated: one for retention rate, and another rank for the number of messages sent and received by the bots.

20 Claims, 12 Drawing Sheets

(56) References Cited

U.S. PATENT DOCUMENTS

| | | |
|---|---|---|
| 9,491,281 B2 | 11/2016 | Kim et al. |
| 9,628,575 B1 | 4/2017 | Lewis et al. |
| 9,661,087 B1 | 5/2017 | Lewis et al. |
| 9,672,289 B1 | 6/2017 | Frind et al. |
| 9,811,586 B2 | 11/2017 | Wetherell et al. |
| 9,934,286 B2 | 4/2018 | Roth et al. |
| 10,230,668 B2 | 3/2019 | Ji et al. |
| 10,372,508 B2* | 8/2019 | Hosabettu ............ G06F 9/4843 |
| 10,412,030 B2* | 9/2019 | McGregor, Jr. ......... H04L 51/10 |
| 2002/0120702 A1 | 8/2002 | Schiavone et al. |
| 2003/0200190 A1* | 10/2003 | Adar ....................... G06Q 10/10 706/45 |
| 2005/0005249 A1 | 1/2005 | Hill et al. |
| 2005/0050301 A1 | 3/2005 | Whittle et al. |
| 2005/0222985 A1 | 10/2005 | Buchheit et al. |
| 2006/0259555 A1 | 11/2006 | Hassounah et al. |
| 2007/0157105 A1 | 7/2007 | Owens et al. |
| 2007/0204308 A1 | 8/2007 | Nicholas et al. |
| 2008/0086343 A1 | 4/2008 | Pendergraft et al. |
| 2008/0089490 A1 | 4/2008 | Mikkonen et al. |
| 2008/0162651 A1 | 7/2008 | Madnani |
| 2008/0220877 A1* | 9/2008 | Guthrie .................. G06Q 30/08 463/42 |
| 2008/0248788 A1 | 10/2008 | Smith et al. |
| 2008/0250323 A1 | 10/2008 | Huff |
| 2009/0254616 A1 | 10/2009 | Cheung et al. |
| 2010/0274628 A1 | 10/2010 | Kunz et al. |
| 2010/0306249 A1* | 12/2010 | Hill ......................... G06Q 30/02 707/769 |
| 2011/0179164 A1* | 7/2011 | Memon ............... H04L 63/1441 709/224 |
| 2011/0231499 A1 | 9/2011 | Stovicek et al. |
| 2011/0246907 A1 | 10/2011 | Wang et al. |
| 2012/0011204 A1 | 1/2012 | Morin et al. |
| 2012/0102126 A1 | 4/2012 | Murphy et al. |
| 2012/0246337 A1 | 9/2012 | Ross |
| 2012/0278388 A1 | 11/2012 | Kleinbart et al. |
| 2012/0322041 A1* | 12/2012 | Weisman .................. G09B 5/00 434/308 |
| 2013/0041952 A1 | 2/2013 | Silas et al. |
| 2013/0198296 A1 | 8/2013 | Roy et al. |
| 2014/0114737 A1 | 4/2014 | Espejo |
| 2014/0136615 A1 | 5/2014 | Li |
| 2014/0164953 A1 | 6/2014 | Lynch et al. |
| 2014/0172840 A1* | 6/2014 | Kumar .................. G06F 40/186 707/723 |
| 2014/0241216 A1 | 8/2014 | Cheng et al. |
| 2014/0253666 A1 | 9/2014 | Ramachandran et al. |
| 2014/0256295 A1 | 9/2014 | Peng et al. |
| 2015/0040027 A1 | 2/2015 | Cheng et al. |
| 2015/0071418 A1 | 3/2015 | Shaffer et al. |
| 2015/0172238 A1 | 6/2015 | Ahmed et al. |
| 2015/0188869 A1 | 7/2015 | Gilad et al. |
| 2015/0271118 A1 | 9/2015 | Nudel et al. |
| 2015/0370905 A1 | 12/2015 | Leon et al. |
| 2016/0031081 A1* | 2/2016 | Johnson ................. B25J 9/1656 700/250 |
| 2016/0044380 A1 | 2/2016 | Barrett |
| 2016/0099892 A1 | 4/2016 | Palakovich et al. |
| 2016/0117384 A1 | 4/2016 | Akavaram et al. |
| 2016/0119390 A1* | 4/2016 | Moeinifar ............. H04L 65/403 709/205 |
| 2016/0132605 A1* | 5/2016 | Jiang ....................... H04L 67/16 707/728 |
| 2016/0239547 A1 | 8/2016 | Lim et al. |
| 2016/0247191 A1 | 8/2016 | Bhalla et al. |
| 2016/0255082 A1 | 9/2016 | Rathod |
| 2016/0261395 A1 | 9/2016 | Agarwal et al. |
| 2016/0284005 A1 | 9/2016 | Daniel et al. |
| 2016/0284011 A1 | 9/2016 | Dong et al. |
| 2016/0285790 A1 | 9/2016 | Szeto et al. |
| 2016/0285816 A1 | 9/2016 | Schmid et al. |
| 2017/0005977 A1 | 1/2017 | Snabl |
| 2017/0034085 A1 | 2/2017 | Bijor et al. |
| 2017/0180276 A1* | 6/2017 | Gershony ............... H04L 51/02 |
| 2017/0214647 A1 | 7/2017 | Shrivastava et al. |
| 2017/0250935 A1* | 8/2017 | Rosenberg ............. H04L 51/16 |
| 2017/0269972 A1* | 9/2017 | Hosabettu ................. G06F 9/46 |
| 2017/0270431 A1* | 9/2017 | Hosabettu ............. G06F 9/4881 |
| 2017/0295114 A1* | 10/2017 | Goldberg ............... H04L 51/02 |
| 2017/0329779 A1 | 11/2017 | Lewin-Eytan et al. |
| 2018/0020067 A1 | 1/2018 | Sadanandan et al. |
| 2018/0060432 A1* | 3/2018 | Kenthapadi ............ G06Q 50/01 |
| 2018/0101533 A1* | 4/2018 | Robichaud .......... H04L 12/2816 |
| 2018/0107685 A1* | 4/2018 | Kale ..................... G06F 16/248 |
| 2018/0108066 A1* | 4/2018 | Kale ..................... G06F 16/532 |
| 2018/0150524 A1* | 5/2018 | Anger .................... H04L 51/02 |
| 2018/0356961 A1 | 12/2018 | Lewis et al. |
| 2019/0347326 A1* | 11/2019 | Kozhaya ................. G06F 40/35 |
| 2020/0050942 A1* | 2/2020 | Sun ......................... G06F 40/40 |
| 2020/0065697 A1* | 2/2020 | Watson ................... G06N 3/006 |
| 2020/0082928 A1* | 3/2020 | Wu ........................ G16H 10/20 |
| 2020/0137002 A1* | 4/2020 | Chavda .................. G06F 17/18 |

* cited by examiner

Bot Search Logic 400

Centralized Communication System 500

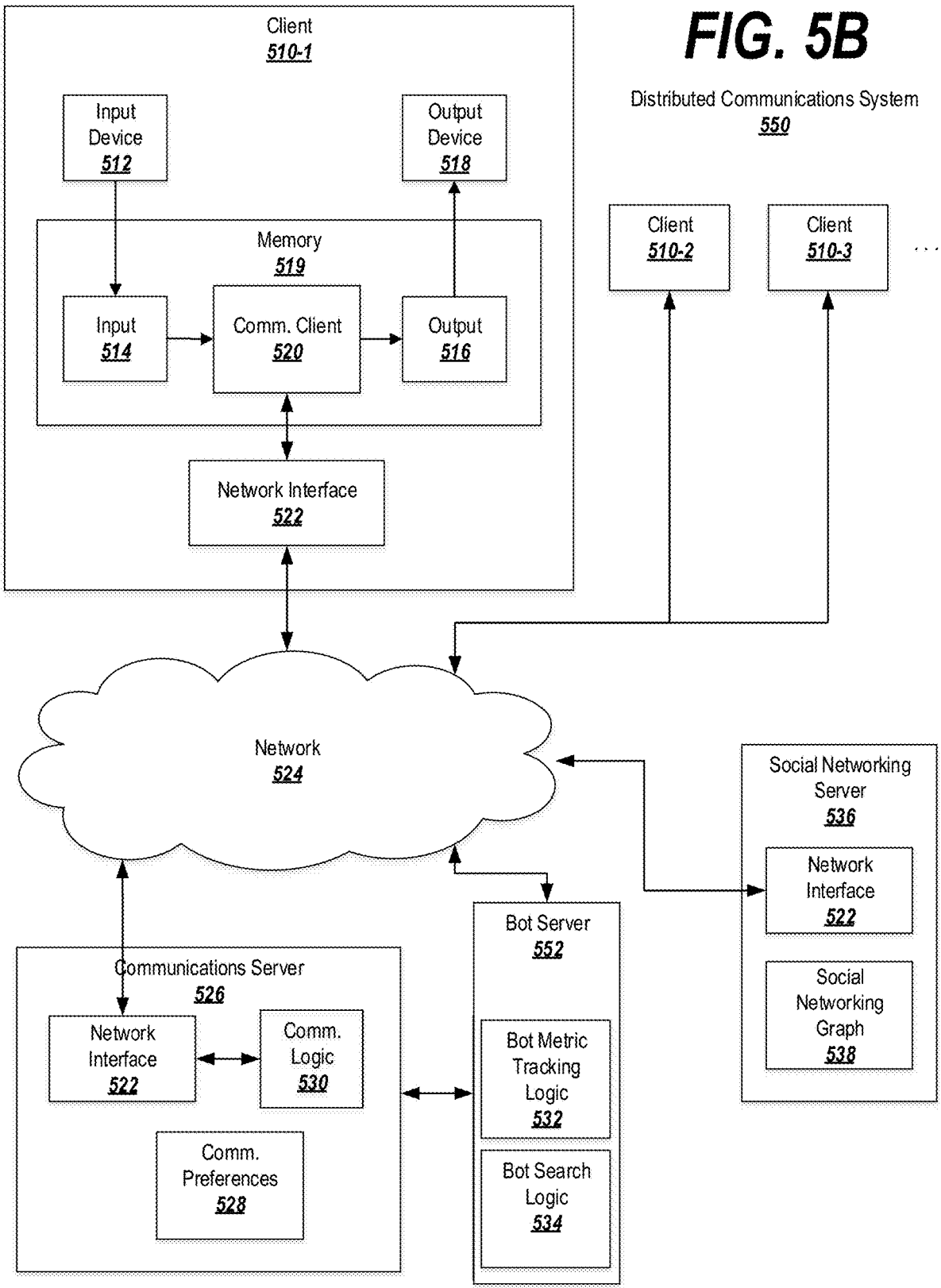

METHODS AND SYSTEMS FOR RANKING MESSAGING BOTS

BACKGROUND

Online messaging robots, or bots, have evolved to the point that they are able to effectively perform tasks or carry on conversations with humans. In some cases, individuals, organizations, and companies are employing bots to conduct customer- or user-facing interactions. As a result, many bots may be available to serve similar purposes. When a user has a task to perform or a query to answer, it may be difficult to identify which bots best suit the user's purpose.

BRIEF DESCRIPTION OF THE DRAWINGS

FIG. 5B is a block diagram providing an overview of a system including an exemplary distributed communications service;

DETAILED DESCRIPTION

Figure 1A:
FIG. 1A depicts an exemplary interface for performing a bot search.

Messaging bots are typically programmed to respond to requests or queries in a specified manner. Because each bot is programmed to respond in distinct manners, different bots may be of higher quality or usefulness to a user. For example, some bots may respond to users quickly and frequently, while others may fail to respond to a request. In some cases, the information provided by the bot is useful, while in others the bot's answers may be nonsensical. Some bots may be sufficiently useful that users return to the bot for new queries or follow-ups, whereas other less successful bots may not see repeat users.

Exemplary embodiments described herein relate to techniques for identifying bots to surface in response to a request, such as a search for bots or a request that a bot perform a particular task. By selecting appropriate bots to surface, a communications system may enable more interaction or an increased number of messages/threads between a user and a bot. This may be achieved by identifying bots that the user is likely to be interested in, and which are likely to respond to the user in a timely manner and with useful information.

In some embodiments, the bots may be associated with a page in a social network. A user may send a message to the social network page, and the bot may respond. Once a system searches for and returns a number of bots, the user may communicate with the bot directly. Alternatively or in addition, the system may serve as a proxy for the bot, with the user submitting queries to the system and the system querying the bot for responses to send back to the originating user.

Identifying the bots to surface may be a two-step process. First, the list of candidate bots may be filtered based on filtering metrics (e.g., whether the bot is properly configured and whether the bot speaks the language of the user). Then, the remaining bots may be ranked based on ranking metrics (e.g., engagement and retention metrics). The ranking metrics may be weighted, with weights being predetermined, based on context, and/or established based on machine learning algorithms. Some of the filtering metrics may be used as ranking metrics, and vice versa.

The metrics may include: the bot's retention rate; the block rate of the page associated with the bot; the number of messages sent or received by the bots; how popular the page is to all users; previous interactions of the user with the page; signals from the page level, including social signals related to the user's friends; the bot's response rate; whether the bot is correctly configured; and the languages spoken by the bot.

According to some embodiments, a predetermined number n of bots (e.g., n=20) may be returned in response to the request. In some embodiments, ranking is performed separately based on bot engagement and bot retention, and the top n/2 bots (e.g., 10) in each category may be returned. The returned bots may be surfaced in a ranked order.

Because the bots are selected at least in part based on retention rate and engagement, the system may return bots that are likely to be useful to a user. The system determines that the bot is likely to respond (due to a relatively high engagement rate) and is likely to do so with pertinent information (due to a relatively high retention rate, indicating that users generally find the bot's information to be helpful).

This brief summary is intended to serve as a non-limiting introduction to the concepts discussed in more detail below. However, before discussing further exemplary embodiments, a brief note on data privacy is first provided. A more detailed description of privacy settings and authentication will be addressed in connection with the following Figures.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous video conversation in a messaging system is next provided As an aid to understanding, a series of examples will first be presented before detailed descriptions of the underlying implementations are described. It is noted that these examples are intended to be illustrative only and that the present invention is not limited to the embodiments shown.

Exemplary Interfaces

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

FIG. 1A depicts an exemplary interface 100 for searching for an entity. The search may specifically be directed at bots, or may be directed at a larger group of entity types, of which bots may be one type.

The interface 100 may be presented in a messaging application for a messaging service and/or a social networking application associated with the messaging service. For example, the interface 100 may be presented when a user searches for contacts to message through a messaging application, or pages to visit in a social networking application. Thus, exemplary embodiments provide entry points to a social networking service from a messaging service, and furthermore provide opportunities for social networking entities to engage with users via messages in the messaging service.

The interface 100 includes a search bar 102 for submitting a search query. According to some embodiments, the search query may be submitted one character at a time and each character (or subsets of characters) may be submitted to a server for performing a search (e.g., a look-ahead search) based on the partial query. Alternatively or in addition to entering text in the search bar 102, information may be submitted as a search query using other input methods (such as audio input).

Based on the search query submitted to the server, the server may search a social networking service (e.g., by searching a social graph of the social networking service) and one or more search results may be returned. The returned results may be displayed in a search results element 104.

As the user continues to enter additional information in the search bar 102, further search queries may be transmitted to the server and the search results element 104 may be updated. If at any point a specific entity exactly matches the search query entered by the user, the specific entity may be displayed as the search result (or at the top of the search results). If no specific entity exactly matches the search query, then a list of ranked and filtered candidate entities may be generated and displayed.

The search results may displayed in a ranked order in the search results element 104. Both the filtering and the determination of the ranked order may be performed based on a number of metrics, some of which may be used for only filtering, only ranking, or both filtering and ranking.

The search results may include any type of entity represented in the social networking service, such as people, businesses, organizations, social networking pages, messaging bots, etc. (individually or in combination with each other). When more than one type of entity is present, the different types of entities may be graphically distinguished from each other. For example, the different types of entities may be represented in different sections of the search results element 104, divided by headers 106 identifying the types of the entities. Entities within a section may be ranked against each other, and each section may be ranked against other sections, as described in more detail below. Alternatively or in addition, the different types of entities may be presented together and ranked against each other without regard to the type of the entity.

In the search results, bots may be presented in their own section, or may be associated or affiliated with another entity. For example, a business or organization may employ a bot to respond to queries submitted through their social networking page.

The user may select one of the search results in the search results element 104 to initiate communication with the selected entity. For example, selecting one of the entities may cause a new messaging thread to be generated between the user and the selected entity.

When the selected entity is a bot, the user may engage in conversation with the bot using the created thread, and may ask the bot to perform actions. For example, the user may ask the bot for information (e.g., the time at which a movie is playing, the name of a particular song, etc.) or may ask the bot to perform a task (e.g., purchasing tickets to the movie, or playing the song).

Figure 1B:
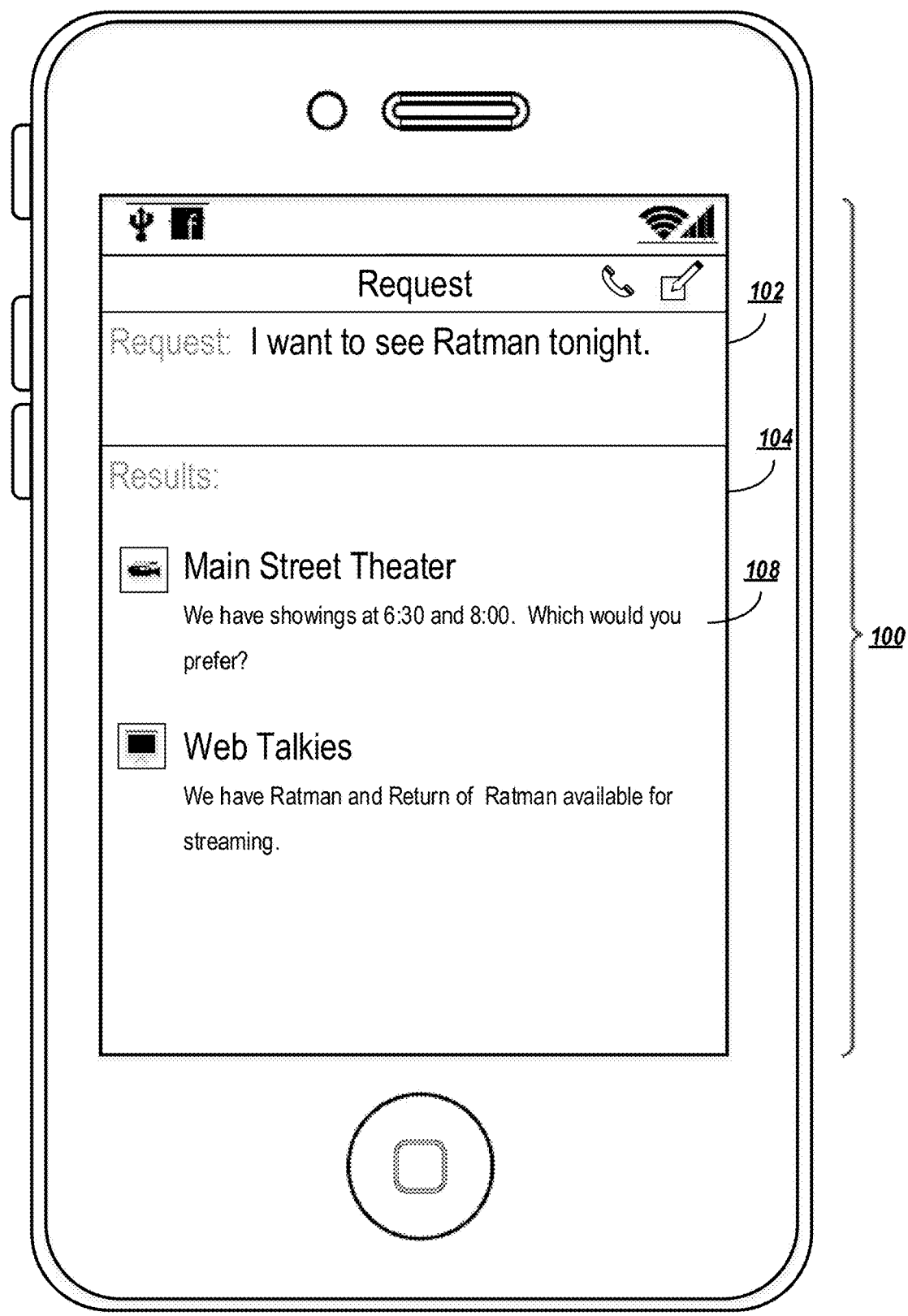
FIG. 1B depicts an exemplary interface for responding to a request.

In some embodiments, the user may submit a query or task directly in the search bar 102, and may receive responses from bots in the search results element 104. FIG. 1B depicts an example of submitting such a query or task.

In response to receiving a request, a system (such as a bot search server) may perform language processing to identify a type of the request, and may search for bots capable of responding to the determined type of request. The system may then query the bots with the request and may return any responses 108 from the bots. The responses 108 may be displayed in the search results element 104. The responses 108 may include information (e.g., "we have the movie you requested available for streaming), a prompt to take an action (e.g., "would you like me to purchase tickets to the movie for you?"), or a follow-up question to elicit further information that the bot considers necessary to be able to provide the requested information or take the requested action (e.g., "what time would you like to see the movie?").

In some embodiments, the system may select the top-ranked bot and provide a response only from that bot. In other embodiments, the system may query the top-ranked bots and provide responses from each. In still other embodiments, the system may return a list of the top-ranked bots that are capable of responding to the request, and the user may select one of the bots for direct interaction.

As noted above, the searches may be performed by a system such as a bot search server. Such a configuration is next described in connection with FIG. 2.

Exemplary System Configuration

Figure 2:
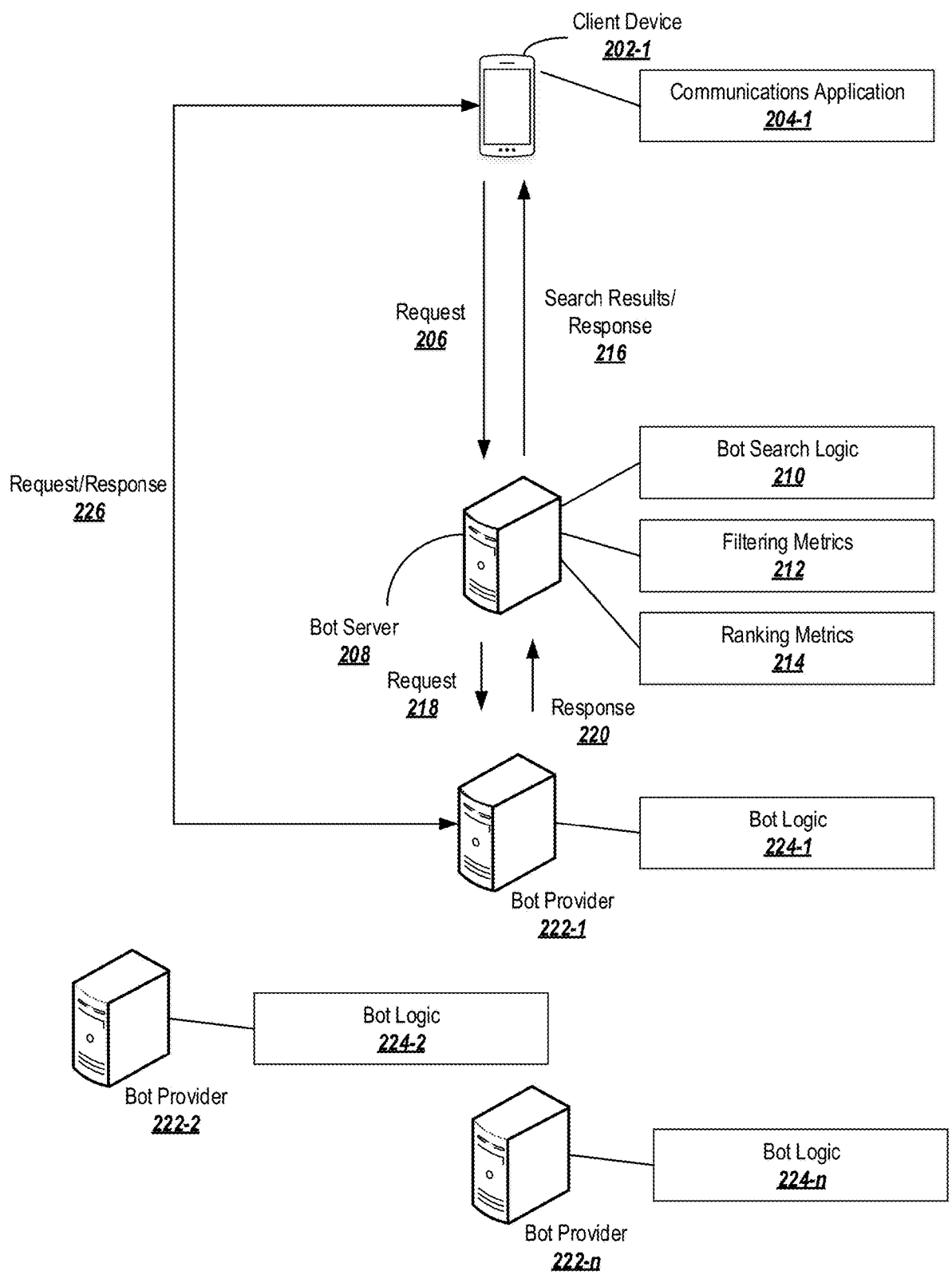
FIG. 2 depicts a block diagram depicting an exemplary structure for storing metrics relating to bots, according to an exemplary embodiment.

FIG. 2 depicts an exemplary system for performing a bot search.

A client 202-1 may be a device associated with a user of a messaging service and/or a social networking service. The client 202-1 may be, for example a mobile device (although the present invention is not limited to application by mobile devices) executing a communications application 204-1 for messaging one or more other participants. The other participants may include any combination of other users, bots, and other entities capable of receiving and responding to a message.

The communications application 204-1 may cause searches or queries to be transmitted in the form of a request 206 to one or more bot servers 208 that are configured to perform bot searches. The request 206 may include structured data and/or unstructured (e.g., raw language) data.

The bot server 208 may maintain a list or database of bots available to respond to the client device 202. The list or database may indicate a name of the bot, a type of requests that the bot is capable of handling, and an identity of a bot provider 222-i, representing a device supporting bot logic 224-i for instantiating a bot. The list or database may also track one or more filtering metrics 212 for filtering out candidate bots, and/or ranking metrics 214 for ranking the filtered list of bots based at least in part on, e.g., retention and engagement metrics. Alternatively or in addition, the filtering metrics 212 and/or engagement metrics 214 may be tracked by the bot providers 222, and the bot server 208 may query the bot providers 222 for values for the metrics on an as-needed basis. Still further, the metrics may be tracked on yet a different system, such as a social networking server, and the bot server 208 may retrieve the metrics from the other system when needed.

The bot server 208 may employ bot search logic 210 (such as the logic depicted in FIG. 4) to search among the available bots for the top-ranked bot or bots to handle the request. In some embodiments, the bot server 208 may serve as a proxy for the bot provider 222, by forwarding the client's request 218 to the bot provider 222 and receiving a response 220 from the bot provider 222. The response 220 may then be forwarded from the bot server 208 to the client device 202.

Figure 3:
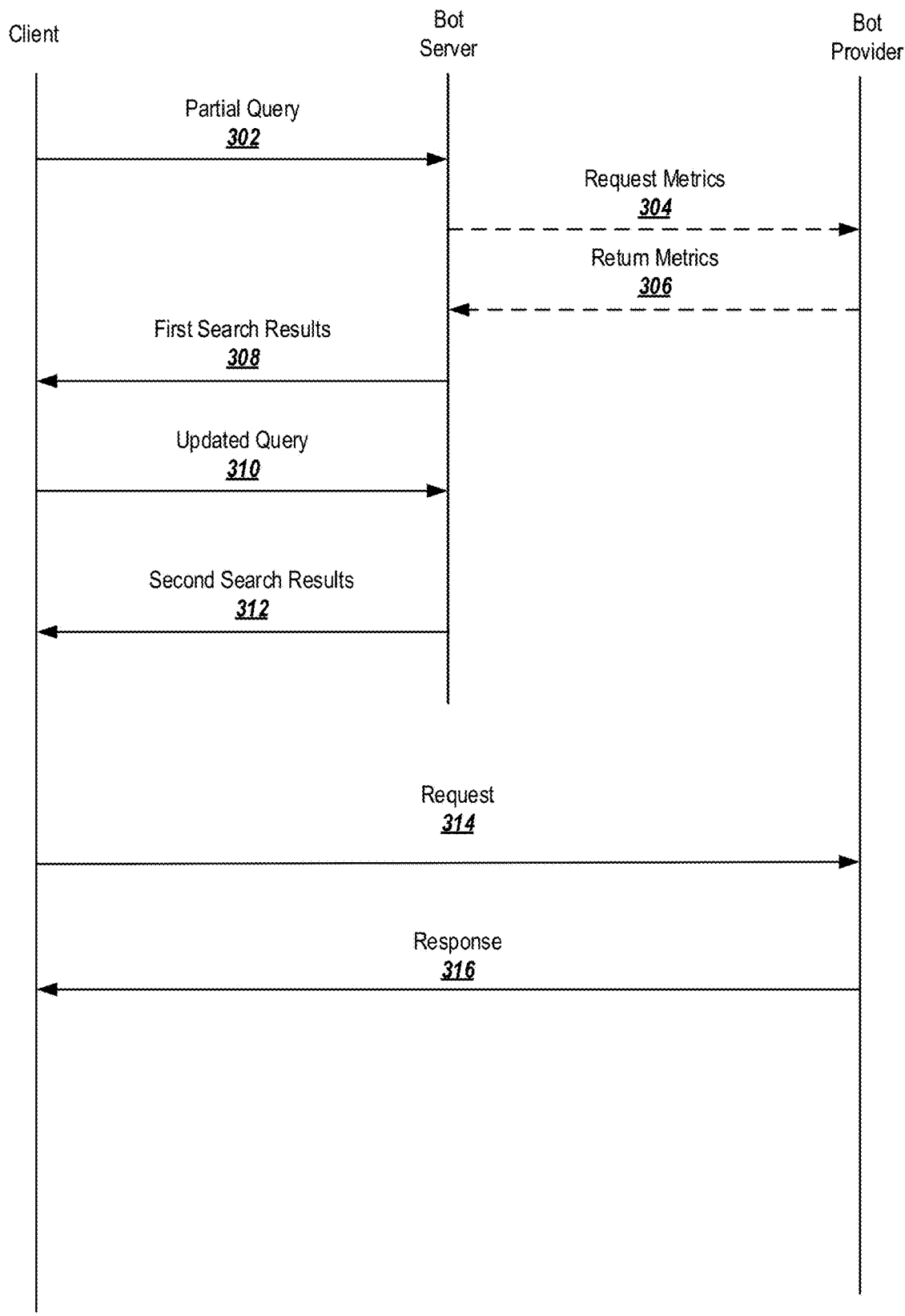
FIG. 3 is a data flow graph depicting information exchange among devices in an exemplary embodiment.

In other embodiments, the bot server 208 may identify a predetermined number of top-ranked bots to return to the client device 202 as search results 216. Upon receiving the list of search results, the client device 202 may communicate directly with the bot by exchanging requests and responses 226 with the bot provider 222. An exemplary data flow diagram depicting such a system is shown in FIG. 3.

The searching client may transmit a partial search query 302, such as a part of a string or entity name. The bot server may receive the partial search query 302 and process the partial search query as described above in connection with FIG. 2 and as described in more detail in connection with FIG. 4. In performing the search, the bot server may rely on one or more filtering and/or ranking metrics. The bot server may regularly track the metrics such that a copy of the metrics are stored locally at the bot server. In this case, the bot server may conduct the search on the basis of the locally-stored metrics. Optionally, the metrics may be tracked by the bot provider or another entity; in this case, the bot server may submit a request for the metrics 304 to the entity responsible for maintaining the metrics, and may receive a copy of the metrics 306 in response.

Based on the metrics, the server may generate first search results 308, which may be transmitted to the searching client in a ranked order or along with a ranking of each result.

As the user continues to type into the search field, the searching client may generate further search queries and may transmit an updated search query 310. The server may process the updated search query 310 in the same manner as the original partial search query 302. The bot server may consult locally-stored metrics during the updated search. Optionally, the bot server may cache any returned metrics 306 that were received as part of the original search query, so that the bot server does not need to continually query the bot provider or other entity for the metrics as additional searches are received.

Based on the updated query 310, the bot server may return second search results 312.

Once the user has identified the bot or entity they wish to message, the user may create a request 314, which may be sent from the client directly to the bot provider. In reply to the request 314, the bot may generate a response 316, which may be transmitted back to the client.

Exemplary procedures for performing the bot search are next described.

Exemplary Methods

Figure 4:
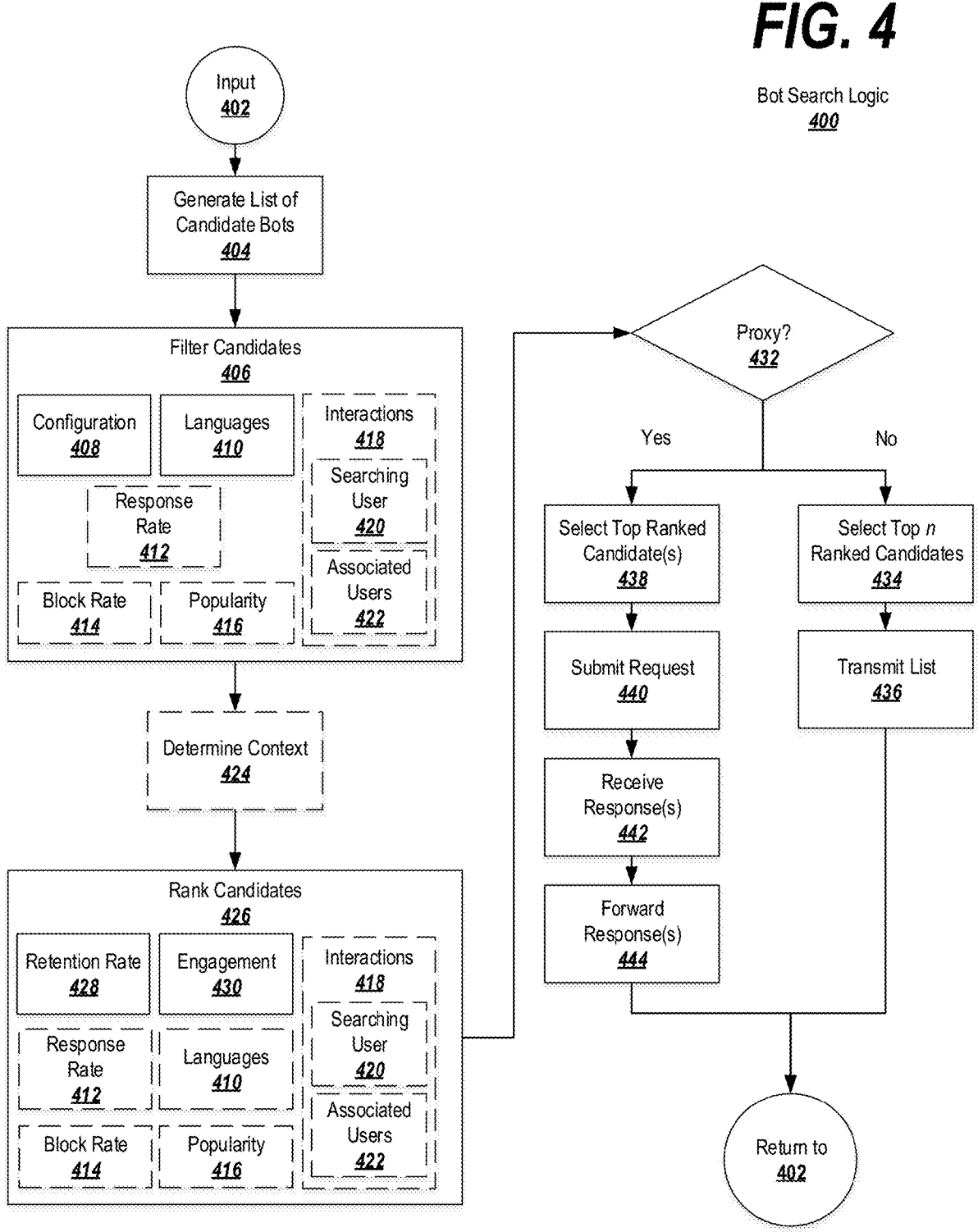
FIG. 4 is a flowchart depicting exemplary logic for performing a method according to an exemplary embodiment.

FIG. 4 is a flowchart depicting exemplary logic 400 for performing a bot search.

At block 402, an input may be received at a system (such as a bot server). The input may be a command, instruction, or other type of request.

At block 404, the system may generate a list of candidate bots. For example, the system may perform natural language processing on the input to determine one or more types of requests that are included in the input. The system may search a database or list of bots for bots that are capable of responding to the type of request included in the input 402.

For example, the request may be a request for information about a topic, in which case the system may generate a list of candidate bots that are capable of performing general web searches, or that are capable of providing information about the topic. The request could be a request to purchase movie tickets or get movie show times, in which case the candidate list may include bots associated with movie theaters, streaming services, third-party movie information sources, etc.

The types of request that the bot is capable of responding to may be defined by the bots themselves (e.g., in metadata associated with the bot), and/or may be determined based on information retrieved from a social networking service. For example, the bot may be associated with a page belonging to an entity in the social networking service. The social networking service may maintain a social graph having one or more nodes affiliated with the entities' pages, and the nodes may be associated with one or more tags.

The database or list may include information retrieved from the social graph nodes affiliated with the page the bot is associated with. The tags from the nodes may be used to identify a type of query that the bot is capable of responding to. For example, a page for a movie theater may be associated with the tag "movie," a tag for the location of the theater, and a tag for the genres of movies played at the theater (comedy, horror, etc.), among other possibilities. If a bot is associated with the movie theater's page, these tags may be used to determine the usefulness of the bot in responding to specific queries. For instance, the bot associated with a movie theater may be relevant to a query about movie show times. A bot associated with a movie theater that only shows independent horror movies may be highly relevant to a query about show times of these movie types, but less relevant to a query about show times for a romantic comedy.

The system may perform natural language processing on the search query to identify the topics addressed by the search query. In some embodiments, the server may generate entity candidates for each sub-span of a search query (i.e., for each n-gram of the query). For example, the search query "new york city bus" may have several sub-spans, including "new york," "new york city," "york," and "city bus."

After identifying sub-spans, the server may generate one or more entity candidates for each sub-span. To do this, the server may consult multiple different sources, such as a social networking service, online encyclopedias, celebrity page names, and bootstrap entities (i.e., entities connected to the querying user) from information stored on the social network's social graph. For example, the server may query an encyclopedia such as Wikipedia to generate several entity candidates from the text "london." Such candidates may include the city in the UK, the town in Ontario, Canada, London Records (a company in the UK), or Jack London (the famous author). Each of these entity candidates may be assigned a unique identifier (and thus represented by a unique node in the social graph).

Alternatively or in addition, the server may generate entity candidates via a bootstrap process. To accomplish this, the server may build a reverse index from bootstrap entities (e.g., entities stored in a particular user's social graph), retrieve all the entities that match a segment of the query or other text string, and keep only the longest match. For example, "Kennedy" may refer to John F. Kennedy, the Kennedy Center in Washington D.C., and another user, named Kennedy Martinez. A user Alex may search for "Kennedy," and the social networking service may access the bootstrap entities associated with Alex's social-graph information. For instance, Alex may be friends with Kennedy Martinez on the social network, and may have recently visited the Kennedy Center to see a musical. He may also have liked a page associated with John F. Kennedy, or read an article about the former president. Each of these actions may correspond to different affinity scores between Alex and the different entities. Reading an article about JFK may produce a lower affinity score than checking in at the Kennedy Center, which may in turn produce a lower affinity score than interacting with Kennedy Martinez on the online social network many times over several months.

The result of the candidate generation block 404 may be a list of candidate entities. At block 406, the list of candidate entities may be filtered based on one or more filtering criteria.

The filtering criteria may include configuration information 408. The configuration information 408 may include information concerning whether the bot is configured correctly according to one or more requirements of the messaging service and/or a social networking service associated with the messaging service. For example, the bot may be required to implement a particular API, to respond correctly to test queries, to respond to queries within a predetermined amount of time, etc. In some cases, the developer of the bot may be required to implement a welcome message that is sent when the bot is first contacted. In others, the developer may be required to implement a "get started" button or similar initiation mechanic. Still further, the messaging service or social networking service may provide a number of features and may require that bots supported by the service implement all or at least some of the features. If the bot is not configured to meet the requirements of the messaging service and/or social networking service, then the bot may be filtered out as ineligible to respond to the request.

The filtering criteria may further include language information 410. The bot may be programmed to communicate in one or more languages. The user submitting the query may indicate the languages that they are able to speak in preference information in the messaging service, or in the social networking service. Alternatively, the query may be processed to determine the language of the query. If the bot is unable to speak the language of the query or any language spoken by the user, the bot may be filtered out.

The filtering criteria may include response rate information 412. The response rate 412 may represent a ratio of the number of times that a bot sends a response as compared to the number of times that a bot receives a message. Some types of bots are not particularly responsive to messages (e.g., they will have a relatively high ratio of messages received to messages sent); if their response rate falls below a predetermined threshold, then they may be filtered out of consideration at block 406.

The filtering criteria may include block rate information 414. The block rate may reflect the number of times or the frequency that the bot or a social networking page associated with the bot is blocked in the messaging or social networking service. For example, the block rate may represent a proportion of users that block the bot or page after receiving a response from the bot or page. A high block rate may indicate that the bot is not providing high quality or useful information, and suggests that users do not wish to speak with the bot.

The filtering criteria may further include popularity information 416. The popularity of the bot or page may reflect the level of interaction with the bot or page among the user base of the messaging or social networking service. For example, one way to measure the popularity of a bot or page is to determine the number of open or active messaging threads for which the bot is one of the participants in a conversation. If the bot is highly active in the messaging or social networking service, this may be an indication that the bot is highly popular and therefore provides high-quality responses.

The filtering criteria may further include interaction information 418. This information may reflect previous interactions between the bot and the current searching user (searching user criterion 420) and/or between the bot and users associated with the current searching user (associated user criterion 422), such as friends of the searching user. The interactions may include, for example, whether the user or associated user "liked" the page associated with the bot or otherwise reacted to the page, commented on posts on the page or otherwise engaged with the page, etc.

Any or all of the filtering criteria may be associated with a predetermined threshold value, below (or above) which the bot is filtered out of consideration. For example, if the bot's response rate is below a certain threshold or the block rate is above a predetermined threshold, the bot may be filtered out of consideration.

According to one embodiment, the system filters the candidate list based on the configuration information 408 and the languages 410 as prerequisites. The system may optionally further filter the list based on the response rates 412, block rates 414, popularity 416, and interaction information 418. For example, if filtering the list based on the configuration information 408 and the languages 410 provides a relatively short list (e.g., less than a predetermined number, such as the number of ranked candidates to be returned to the user), then filtering may be stopped and processing may proceed to block 424. On the other hand, if such filtering results in a relatively large number of candidates (e.g., more than 2-3 times the number of ranked candidates to be returned to the user), then the list may be further filtered based on additional criteria.

The result of block 406 may be a filtered list of candidate bots.

At block 424, the system may optionally determine a context for the query. The context may include, for example, a category of a page associated with the bot, an age of a user associated with the input, a gender of the user, an interest of the user, a time of day, or a seasonality. The context may be used to modify how much the criteria for ranking are weighted. Alternatively or in addition, the context may be used to determine whether optional filtering or ranking criteria are used, or to determine a level of thresholds associated with the filtering and/or ranking criteria.

At block 426, the system may rank the filtered list of candidate bots based on ranking metrics, which may be weighted based on the context and/or other factors.

The ranking metrics may include a retention rate 428 of the bot. The retention rate may reflect a number of users that, after speaking with the bot, return to speak with the bot again. If users repeatedly patronize the bot, this may be an indication that the bot provides high-quality or useful responses, and the bot may be elevated in the rankings. The retention rate may be defined over a predetermined time period (e.g., how many users return to the bot within 7 days). The retention rate may be associated with a plurality of time periods providing progressively decreasing weights—for example, users that return within one day may be weighted more than users that return within seven days.

The ranking metrics may further include an engagement level 430 of the bot. The engagement level may be a measure reflecting how much the bots are engaging with users (e.g., by responding to queries) as opposed to simply transmitting messages. For example, some types of bots (e.g., news bots) may send a large number of messages, but these may not be sent in response to any particular query. These types of bots may also be considered to have a low engagement level, since the messages are not in reply to any specific query.

The ranking metrics may also include the response rate 412, language information 410, a block rate 414, popularity information 416, and interaction information 418. This information may be similar to the filtering criteria discussed above, and further description of these elements is omitted for the sake of brevity. The manner in which these metrics are used for filtering may be different than the manner in which they are used for ranking. For example, a user may be able to speak a primary language and a secondary language. If the user queries the bot in the primary language, and the bot is unable to speak the primary language, then the bot may be filtered out at block 406. Alternatively, if the bot is not able to speak the primary language but is able to speak the secondary language, then the bot may be retained at block 406, but may be ranked lower based on the language criterion 410 in block 426.

In another example, a bot with a low response rate 412, a high block rate, a low popularity 416, or insignificant interaction data 418 may be filtered out at block 406, or may be decreased in rank at block 426.

In some cases, a bot may be filtered out if one of the overlapping metrics is below a first predetermined low threshold. If the bot is not filtered out because the metric is above the threshold, then the bot may be ranked. If the metric is above the first predetermined low threshold but is below a second predetermined intermediate threshold (i.e., the bot's score does not rank low enough to be filtered out, but does not rank highly enough that the system has high confidence the bot will respond in a useful manner), then the bot may be penalized in the rankings. If the metric is above a third predetermined high threshold, then the bot may be unpenalized or may receive an increase in the rankings.

Accordingly, some or all of these metrics may be used as both filtering metrics and ranking metrics.

In some embodiments, some or all of the metrics at block 426 may be associated with a weight that increases or decreases the metrics' relevance to the ranking process. The weight may be predetermined, may be established on a user-by-user basis or for a set of users based on machine learning, or may be determined based on context (e.g., the response rate may be prioritized in the middle of the day, when high-priority requests are likely to occur, and de-prioritized at night, when the request is likely to be of lower priority).

After the candidates are ranked at block 426, processing may proceed to block 432 and the system may determine whether it is configured to act as a proxy for the bots. If the determination at block 432 is "NO" (the system is not configured to act as a proxy for the bots), then processing may proceed to block 434.

At block 434, the system selects a predetermined number n of candidates to return. In some embodiments, the system returns the top n ranked candidates from block 426 based on the ranking scores. In other embodiments, separate ranked lists may be maintained for the retention rate metric 428 and the engagement metric 430. The system may return the top candidates on each list (e.g., in round-robin fashion) until n candidates have been returned. At block 436, the resulting list of ranked bots may be transmitted to the client device that submitted the original input, and processing may return to block 402 to await additional input.

If the determination at block 432 is "YES" (the system is configured to act as a proxy for the bots), then processing may proceed to block 438.

At block 438, the system may select one or more top-ranked candidates. For example, the system may select the highest-ranked candidate, or may select a predetermined or dynamically determined number of candidates. The number of candidates selected may be determined based on the number of responses that the system determines will fit within the available screen real estate on an interface of the client device.

At block 440, the system may submit the request or query from the original input received at block 402 to the bots selected at block 438. The system may receive responses from the bots at block 442.

At block 444, any responses received from the bots may be transmitted to the client device that submitted the original input, and processing may return to block 402 to await additional input.

Next, n exemplary communications system suitable for implementing the above logic is described with reference to FIGS. 5A-9.

Communications System Overview

Figure 5A:
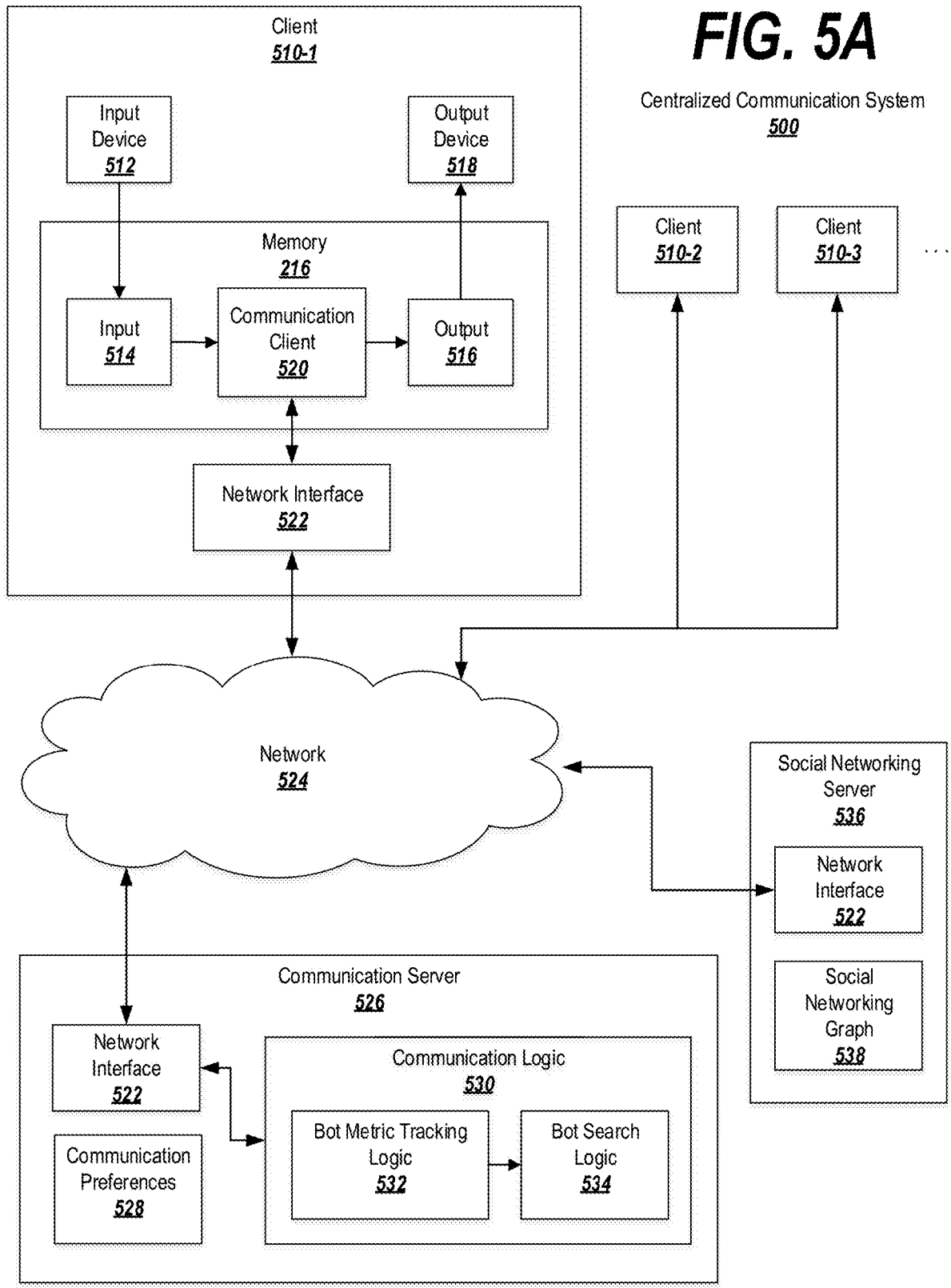
FIG. 5A is a block diagram providing an overview of a system including an exemplary centralized communications service.
Figure 5C:
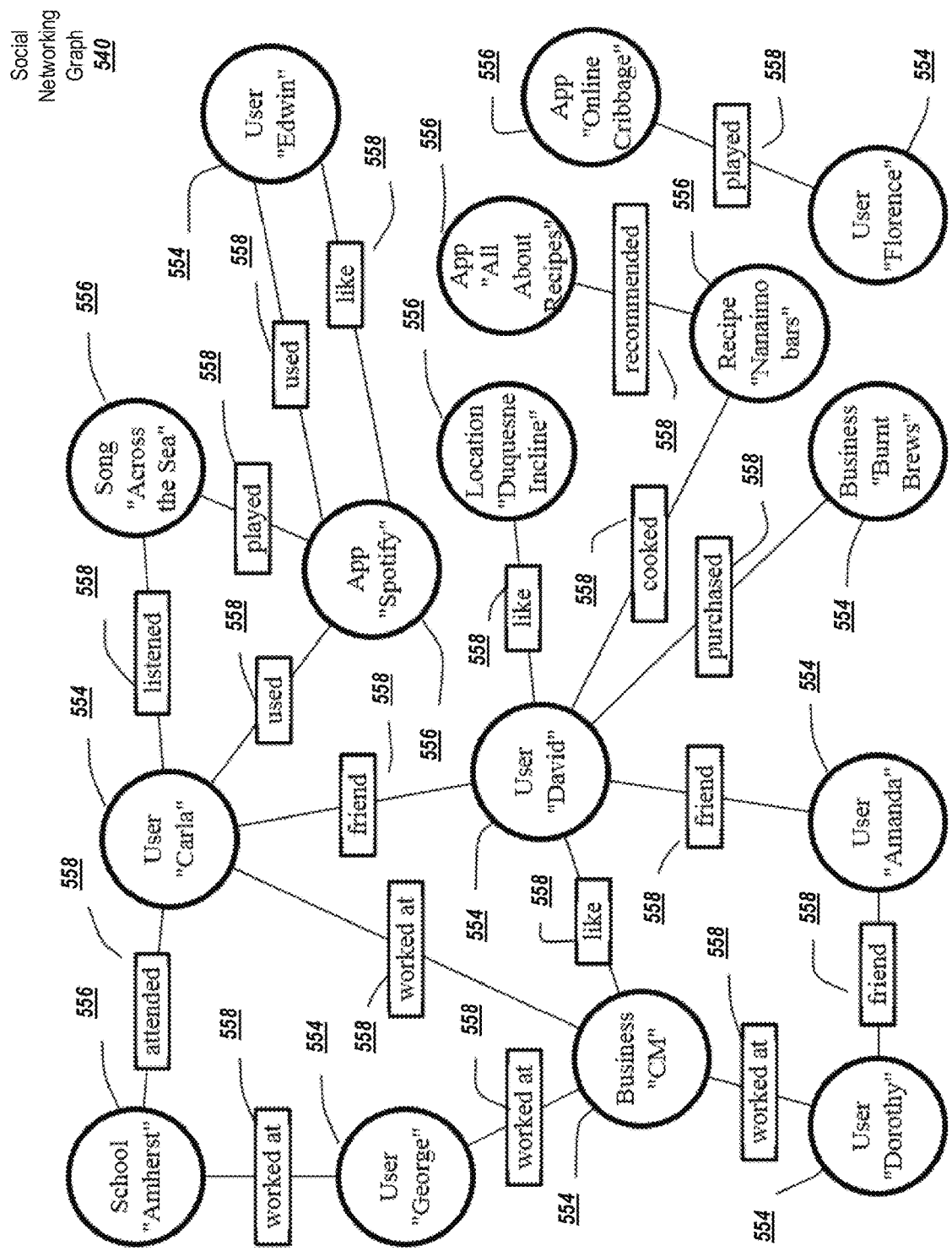
FIG. 5C depicts the social networking graph of FIGS. 8A-8B in more detail.

These examples may be implemented by a communications system (such as a communications system provided by a messaging service) that is provided either locally, at a client device, or remotely (e.g., at a remote server). FIGS. 5A-5C depict various examples of communications systems, and are discussed in more detail below.

FIG. 5A depicts an exemplary centralized communications system 500 generally arranged to receive, store, and deliver video communications. The centralized system 500 may implement some or all of the structure and/or operations of a communications service in a single computing entity, such as entirely within a single centralized server device 526.

The communications system 500 may include a computer-implemented system having software applications that include one or more components. Although the communications system 500 shown in FIG. 5A has a limited number of elements in a certain topology, the communications system 500 may include more or fewer elements in alternate topologies.

A client device 510 may transmit communications addressed to one or more recipient users, user accounts, or other identifiers resolving to one or more receiving client devices 510. In exemplary embodiments, each of the client devices 510 and their respective communications clients 520 are associated with a particular user or users of the communications service 500. In some embodiments, the client devices 510 may be cellular devices such as smartphones and may be identified to the communications service 500 based on a phone number associated with each of the client devices 510. In some embodiments, each communications client may be associated with a user account registered with the communications service 500. In general, each communications client may be addressed through various techniques for the reception of communications. While in some embodiments the client devices 510 may be cellular devices, in other embodiments one or more of the client devices 510 may be personal computers, tablet devices, any other form of computing device.

The client 510 may include one or more input devices 512 and one or more output devices 518. The input devices 512 may include, for example, microphones, keyboards, cameras, electronic pens, touch screens, and other devices for receiving inputs including communications data, requests, commands, user interface interactions, selections, and other types of input. The output devices 518 may include a speaker, a display device such as a monitor or touch screen, and other devices for presenting an interface to the communications system 500.

The client 510 may include a memory 519, which may be a non-transitory computer readable storage medium, such as one or a combination of a hard drive, solid state drive, flash storage, read only memory, or random access memory. The memory 519 may a representation of an input 514 and/or a representation of an output 516, as well as one or more applications. For example, the memory 519 may store a communications client 520 and/or a social networking client that allows a user to interact with a social networking service.

The input 514 may be textual, such as in the case where the input device 212 is a keyboard. Alternatively, the input 514 may be an audio recording, such as in the case where the input device 512 is a microphone and/or a video recording, such as in the case where the input device 512 is a camera. The input 514 may be subjected to automatic speech recognition (ASR) logic in order to transform an audio recording to text that is processable by the communications system 500. The ASR logic may be located at the client device 510 (so that the audio recording is processed locally by the client 510 and corresponding text is transmitted to the messaging server 526), or may be located remotely at the messaging server 526 (in which case, the audio recording may be transmitted to the messaging server 526 and the messaging server 526 may process the audio into text). Other combinations are also possible—for example, if the input device 512 is a touch pad or electronic pen, the input 514 may be in the form of handwriting, which may be subjected to handwriting or optical character recognition analysis logic in order to transform the input 512 into processable text.

The client 510 may be provided with a network interface 522 for communicating with a network 524, such as the Internet. The network interface 522 may transmit the input 512 in a format and/or using a protocol compatible with the network 524 and may receive a corresponding output 516 from the network 524.

The network interface 522 may communicate through the network 524 to a communications server 526. The communications server 526 may be operative to receive, store, and forward communications between communications clients.

The communications server 526 may include a network interface 522, communications preferences 528, and communications logic 530. The communications preferences 528 may include one or more privacy settings for one or more users and/or communications. Furthermore, the communications preferences 528 may include one or more settings, including default settings, for the logic described herein.

The communications logic 530 may include bot metric tracking logic 532 that is operable to track and store metrics relating to the above-described filtering and ranking criteria. The communications logic 530 may further include bot search logic 534 that is operable to process bot requests or searches for bots and transmit the results to the client 510.

In some embodiments, communications may be sent peer-to-peer between users without the use of intervening server devices such as may implement the communications service 500. In these embodiments, the communications logic 530, including the bot metric tracking logic 532 and the bot search logic 534, may reside on the client devices 510.

The network interface 522 of the client 510 and/or the communications server 526 may also be used to communicate through the network 524 with a social networking server 536. The social networking server 536 may include or may interact with a social networking graph 538 that defines connections in a social network. Furthermore, the communications server 526 may connect to the social networking server 536 for various purposes, such as retrieving connection information, messaging history, event details, etc. from the social network.

A user of the client 510 may be an individual (human user), an entity (e.g., an enterprise, business, or third-party application), or a group (e.g., of individuals or entities) that interacts or communicates with or over the social networking server 536. The social-networking server 536 may be a network-addressable computing system hosting an online social network. The social networking server 536 may generate, store, receive, and send social-networking data, such as, for example, user-profile data, concept-profile data, social-graph information, or other suitable data related to the online social network. The social networking server 536 may be accessed by the other components of the network environment either directly or via the network 524.

The social networking server 536 may include an authorization server (or other suitable component(s)) that allows users to opt in to or opt out of having their actions logged by social-networking server 536 or shared with other systems (e.g., third-party systems, such as the messaging server 526), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 536 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 538. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 536 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social networking server 536 may send a request to the data store for the object. The request may identify the user associated with the request. The requested data object may only be sent to the user (or a client system 510 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social-networking server 536 or explicit connections of a user to a node, object, entity, brand, or page on social networking server 536. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The centralized embodiment depicted in FIG. 5A may be well-suited to deployment as a new system or as an upgrade to an existing system, because the logic for applying media effects (e.g., the index generation logic 532 and/or the index application logic 534) are incorporated into the communications server 526. In contrast, FIG. 5B depicts an exemplary distributed communications system 550, in which functionality for recognizing productive intent and generating a list of suggested recipients is distributed and remotely accessible from the messaging server. Examples of a distributed system 550 include a client-server architecture, a 3-tier architecture, an N-tier architecture, a tightly-coupled or clustered architecture, a peer-to-peer architecture, a master-slave architecture, a shared database architecture, and other types of distributed systems.

Many of the components depicted in FIG. 5B are identical to those in FIG. 5A, and a description of these elements is not repeated here for the sake of brevity. The primary difference between the centralized embodiment and the distributed embodiment is the addition of a separate bot server 552, which hosts the bot metric tracking logic 532 and the bot search logic 534. The bot server 552 may be distinct from the communications server 526 but may communicate with the communications server 526, either directly or through the network 524, to provide the functionality of the bot metric tracking logic 532 and the bot search logic 534 to the communications server 526.

The embodiment depicted in FIG. 5B may be particularly well suited to allow exemplary embodiments to be deployed alongside existing communications systems, for example when it is difficult or undesirable to replace an existing communications server. Additionally, in some cases the communications server 526 may have limited resources (e.g. processing or memory resources) that limit or preclude the addition of the additional pivot functionality. In such situations, the capabilities described herein may still be provided through the separate media effect server 552.

FIG. 5C illustrates an example of a social networking graph 538. In exemplary embodiments, a social networking service may store one or more social graphs 538 in one or more data stores as a social graph data structure via the social networking service.

The social graph 538 may include multiple nodes, such as user nodes 554 and concept nodes 556. The social graph 228 may furthermore include edges 558 connecting the nodes. The nodes and edges of social graph 228 may be stored as data objects, for example, in a data store (such as a social-graph database). Such a data store may include one or more searchable or queryable indexes of nodes or edges of social graph 228.

The social graph 538 may be accessed by a social-networking server 226, client system 210, third-party system (e.g., the translation server 224), or any other approved system or device for suitable applications.

A user node 554 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 554 corresponding to the user, and store the user node 30 in one or more data stores. Users and user nodes 554 described herein may, where appropriate, refer to registered users and user nodes 554 associated with registered users. In addition or as an alternative, users and user nodes 554 described herein may, where appropriate, refer to users that have not registered with the social-networking system. In particular embodiments, a user node 554 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 554 may be associated with one or more data objects corresponding to information associated with a user. In particular embodiments, a user node 554 may correspond to one or more webpages. A user node 554 may be associated with a unique user identifier for the user in the social-networking system.

In particular embodiments, a concept node 556 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 556 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 556 may be associated with one or more data objects corresponding to information associated with concept node 556. In particular embodiments, a concept node 556 may correspond to one or more webpages.

In particular embodiments, a node in social graph 538 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 556. Profile pages may be viewable by all or a selected subset of other users. As an example and not by way of limitation, a user node 554 may have a corresponding user-profile page in which the corresponding user may add content, make declarations, or otherwise express himself or herself. A business page such as business page 205 may comprise a user-profile page for a commerce entity. As another example and not by way of limitation, a concept node 556 may have a corresponding concept-profile page in which one or more users may add content, make declarations, or express themselves, particularly in relation to the concept corresponding to concept node 556.

In particular embodiments, a concept node 556 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 554 corresponding to the user and a concept node 556 corresponding to the third-party webpage or resource and store edge 558 in one or more data stores.

In particular embodiments, a pair of nodes in social graph 538 may be connected to each other by one or more edges 558. An edge 558 connecting a pair of nodes may represent a relationship between the pair of nodes. In particular embodiments, an edge 558 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 558 connecting the first user's user node 554 to the second user's user node 554 in social graph 538 and store edge 558 as social-graph information in one or more data stores. In the example of FIG. 5C, social graph 538 includes an edge 558 indicating a friend relation between user nodes 554 of user "Amanda" and user "Dorothy." Although this disclosure describes or illustrates particular edges 558 with particular attributes connecting particular user nodes 554, this disclosure contemplates any suitable edges 558 with any suitable attributes connecting user nodes 554. As an example and not by way of limitation, an edge 558 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 538 by one or more edges 558.

In particular embodiments, an edge 558 between a user node 554 and a concept node 556 may represent a particular action or activity performed by a user associated with user node 554 toward a concept associated with a concept node 556. As an example and not by way of limitation, as illustrated in FIG. 5C, a user may "like," "attended," "played," "listened," "cooked," "worked at," or "watched" a concept, each of which may correspond to a edge type or subtype. A concept-profile page corresponding to a concept node 556 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 558 and a "used" edge (as illustrated in FIG. 5C) between user nodes 554 corresponding to the user and concept nodes 556 corresponding to the song and application to indicate that the user listened to the song and used the application. Moreover, the social-networking system may create a "played" edge 558 (as illustrated in FIG. 5C) between concept nodes 556 corresponding to the song and the application to indicate that the particular song was played by the particular application. In this case, "played" edge 558 corresponds to an action performed by an external application (SPOTIFY) on an external audio file (the song "Across the Sea"). Although this disclosure describes particular edges 558 with particular attributes connecting user nodes 554 and concept nodes 556, this disclosure contemplates any suitable edges 558 with any suitable attributes connecting user nodes 554 and concept nodes 556. Moreover, although this disclosure describes edges between a user node 554 and a concept node 556 representing a single relationship, this disclosure contemplates edges between a user node 554 and a concept node 556 representing one or more relationships. As an example and not by way of limitation, an edge 558 may represent both that a user likes and has used at a particular concept. Alternatively, another edge 558 may represent each type of relationship (or multiples of a single relationship) between a user node 554 and a concept node 556 (as illustrated in FIG. 5C between user node 554 for user "Edwin" and concept node 556 for "SPOTIFY").

In particular embodiments, the social-networking system may create an edge 558 between a user node 554 and a concept node 556 in social graph 538. As an example and not by way of limitation, a user viewing a concept-profile page (such as, for example, by using a web browser or a special-purpose application hosted by the user's client system) may indicate that he or she likes the concept represented by the concept node 556 by clicking or selecting a "Like" icon, which may cause the user's client system to send to the social-networking system a message indicating the user's liking of the concept associated with the concept-profile page. In response to the message, the social-networking system may create an edge 558 between user node 554 associated with the user and concept node 556, as illustrated by "like" edge 558 between the user and concept node 556. In particular embodiments, the social-networking system may store an edge 558 in one or more data stores. In particular embodiments, an edge 558 may be automatically formed by the social-networking system in response to a particular user action. As an example and not by way of limitation, if a first user uploads a picture, watches a movie, or listens to a song, an edge 558 may be formed between user node 554 corresponding to the first user and concept nodes 556 corresponding to those concepts. Although this disclosure describes forming particular edges 558 in particular manners, this disclosure contemplates forming any suitable edges 558 in any suitable manner.

The social graph 538 may further comprise a plurality of product nodes. Product nodes may represent particular products that may be associated with a particular business. A business may provide a product catalog to a consumer-to-business service and the consumer-to-business service may therefore represent each of the products within the product in the social graph 538 with each product being in a distinct product node. A product node may comprise information relating to the product, such as pricing information, descriptive information, manufacturer information, availability information, and other relevant information. For example, each of the items on a menu for a restaurant may be represented within the social graph 538 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 538. The information for a product node may be manipulated by the social-networking system as a product object that encapsulates information regarding the referenced product.

As such, the social graph 538 may be used to infer shared interests, shared experiences, or other shared or common attributes of two or more users of a social-networking system. For instance, two or more users each having an edge to a common business, product, media item, institution, or other entity represented in the social graph 538 may indicate a shared relationship with that entity, which may be used to suggest customization of a use of a social-networking system, including a messaging system, for one or more users.

The embodiments described above may be performed by a messaging architecture, an example of which is next described with reference to FIG. 6.

Messaging Architecture

Figure 6:
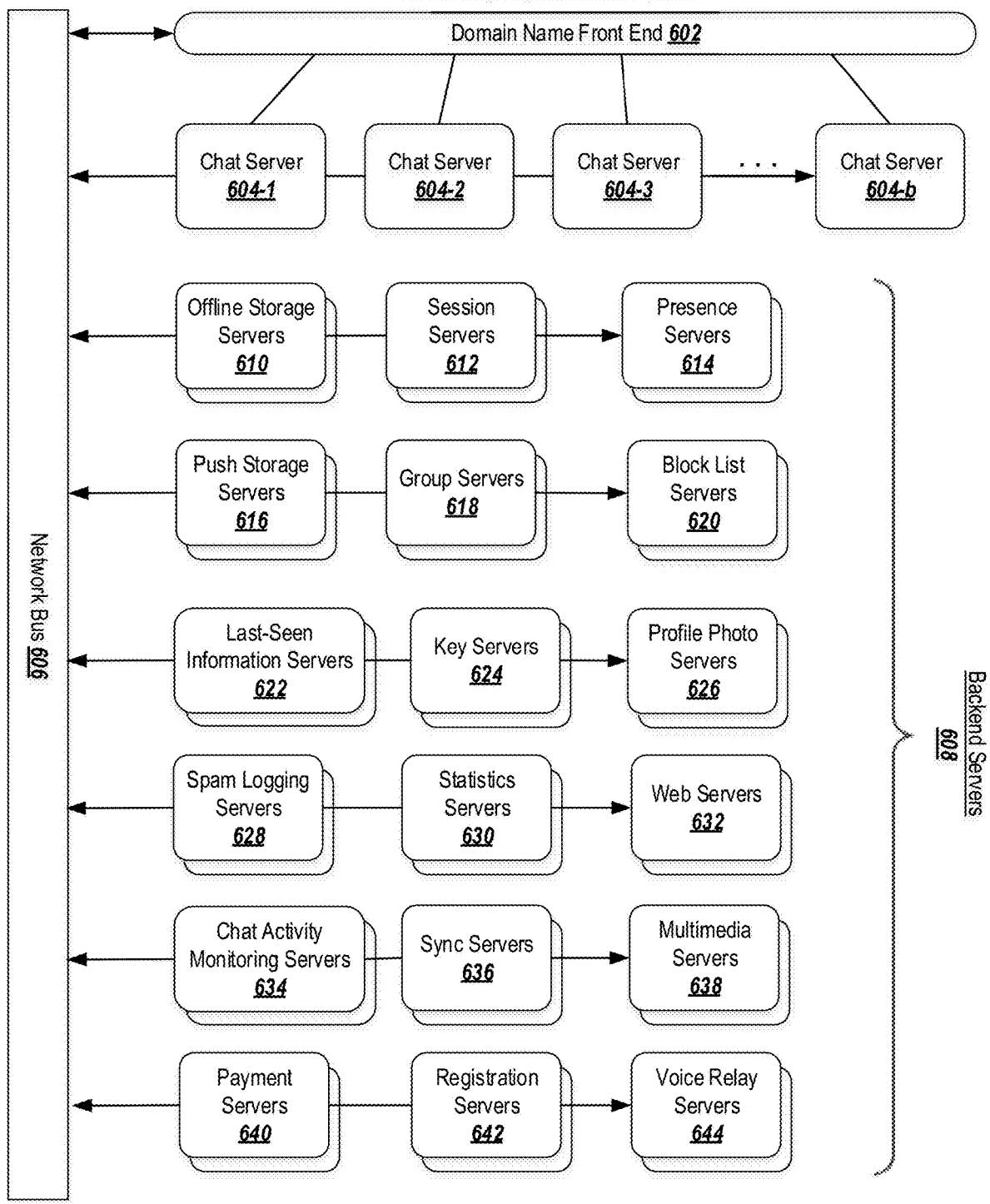
FIG. 6 is a block diagram depicting an example of a system for a messaging service.

FIG. 6 illustrates an embodiment of a plurality of servers implementing various functions of a messaging service 600. It will be appreciated that different distributions of work and functions may be used in various embodiments of a messaging service 600.

The messaging service 600 may comprise a domain name front end 602. The domain name front end 602 may be assigned one or more domain names associated with the messaging service 600 in a domain name system (DNS). The domain name front end 602 may receive incoming connections and distribute the connections to servers providing various messaging services.

The messaging service 602 may comprise one or more chat servers 604. The chat servers 604 may comprise front-end servers for receiving and transmitting user-to-user messaging updates such as chat messages. Incoming connections may be assigned to the chat servers 604 by the domain name front end 602 based on workload balancing.

The messaging service 600 may comprise backend servers 608. The backend servers 608 may perform specialized tasks in the support of the chat operations of the front-end chat servers 604. A plurality of different types of backend servers 608 may be used. It will be appreciated that the assignment of types of tasks to different backend serves 608 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 600 may comprise one or more offline storage servers 610. The one or more offline storage servers 610 may store messaging content for currently-offline messaging clients in hold for when the messaging clients reconnect.

The messaging service 600 may comprise one or more sessions servers 612. The one or more session servers 612 may maintain session state of connected messaging clients.

The messaging service 600 may comprise one or more presence servers 614. The one or more presence servers 614 may maintain presence information for the messaging service 600. Presence information may correspond to user-specific information indicating whether or not a given user has an online messaging client and is available for chatting, has an online messaging client but is currently away from it, does not have an online messaging client, and any other presence state.

The messaging service 600 may comprise one or more push storage servers 616. The one or more push storage servers 616 may cache push requests and transmit the push requests to messaging clients. Push requests may be used to wake messaging clients, to notify messaging clients that a messaging update is available, and to otherwise perform server-side-driven interactions with messaging clients.

The messaging service 600 may comprise one or more group servers 618. The one or more group servers 618 may maintain lists of groups, add users to groups, remove users from groups, and perform the reception, caching, and forwarding of group chat messages.

The messaging service 600 may comprise one or more block list servers 620. The one or more block list servers 620 may maintain user-specific block lists, the user-specific incoming-block lists indicating for each user the one or more other users that are forbidden from transmitting messages to that user. Alternatively or additionally, the one or more block list servers 620 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 600 may comprise one or more last seen information servers 622. The one or more last seen information servers 622 may receive, store, and maintain information indicating the last seen location, status, messaging client, and other elements of a user's last seen connection to the messaging service 600.

The messaging service 600 may comprise one or more key servers 624. The one or more key servers may host public keys for public/private key encrypted communication.

The messaging service 600 may comprise one or more profile photo servers 626. The one or more profile photo servers 626 may store and make available for retrieval profile photos for the plurality of users of the messaging service 600.

The messaging service 600 may comprise one or more spam logging servers 628. The one or more spam logging servers 628 may log known and suspected spam (e.g., unwanted messages, particularly those of a promotional nature). The one or more spam logging servers 628 may be operative to analyze messages to determine whether they are spam and to perform punitive measures, in some embodiments, against suspected spammers (users that send spam messages).

The messaging service 600 may comprise one or more statistics servers 630. The one or more statistics servers may compile and store statistics information related to the operation of the messaging service 600 and the behavior of the users of the messaging service 600.

The messaging service 600 may comprise one or more web servers 632. The one or more web servers 632 may engage in hypertext transport protocol (HTTP) and hypertext transport protocol secure (HTTPS) connections with web browsers.

The messaging service 600 may comprise one or more chat activity monitoring servers 634. The one or more chat activity monitoring servers 634 may monitor the chats of users to determine unauthorized or discouraged behavior by the users of the messaging service 600. The one or more chat activity monitoring servers 634 may work in cooperation with the spam logging servers 628 and block list servers 620, with the one or more chat activity monitoring servers 634 identifying spam or other discouraged behavior and providing spam information to the spam logging servers 628 and blocking information, where appropriate to the block list servers 620.

The messaging service 600 may comprise one or more sync servers 636. The one or more sync servers 636 may sync the messaging system 500 with contact information from a messaging client, such as an address book on a mobile phone, to determine contacts for a user in the messaging service 600.

The messaging service 600 may comprise one or more multimedia servers 638. The one or more multimedia servers may store multimedia (e.g., images, video, audio) in transit between messaging clients, multimedia cached for offline endpoints, and may perform transcoding of multimedia.

The messaging service 600 may comprise one or more payment servers 640. The one or more payment servers 640 may process payments from users. The one or more payment servers 640 may connect to external third-party servers for the performance of payments.

The messaging service 600 may comprise one or more registration servers 642. The one or more registration servers 642 may register new users of the messaging service 600.

The messaging service 600 may comprise one or more voice relay servers 644. The one or more voice relay servers 644 may relay voice-over-internet-protocol (VoIP) voice communication between messaging clients for the performance of VoIP calls.

Figure 7:
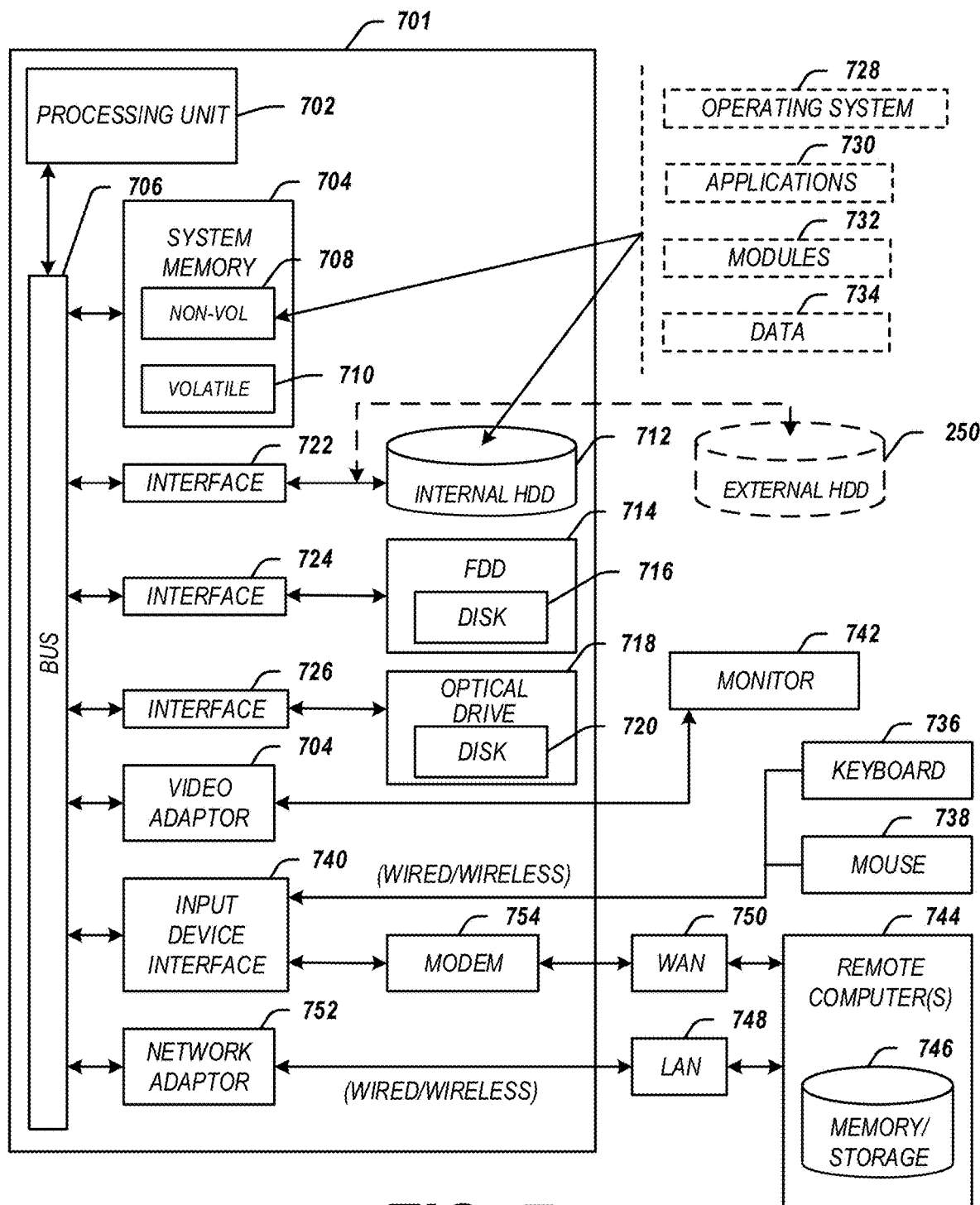
FIG. 7 is a block diagram illustrating an exemplary computing device suitable for use with exemplary embodiments.

The above-described methods may be embodied as instructions on a computer readable medium or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the messaging system 500.

A user can enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 744. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
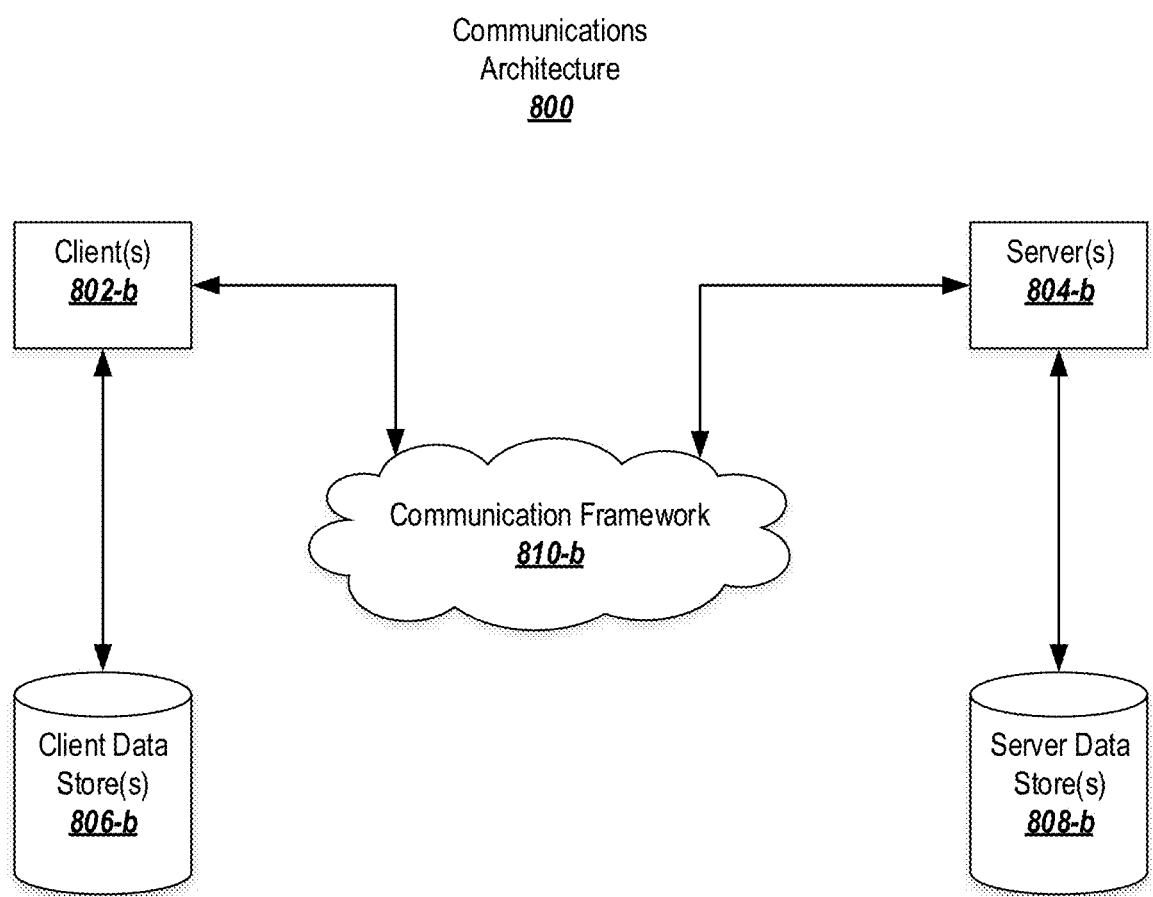
FIG. 8 depicts an exemplary communication architecture.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 may implement the client device 510. The servers 804 may implement the server device 526. The clients 802 and the servers 804 are operatively connected to one or more respective client data stores 806 and server data stores 808 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 9:
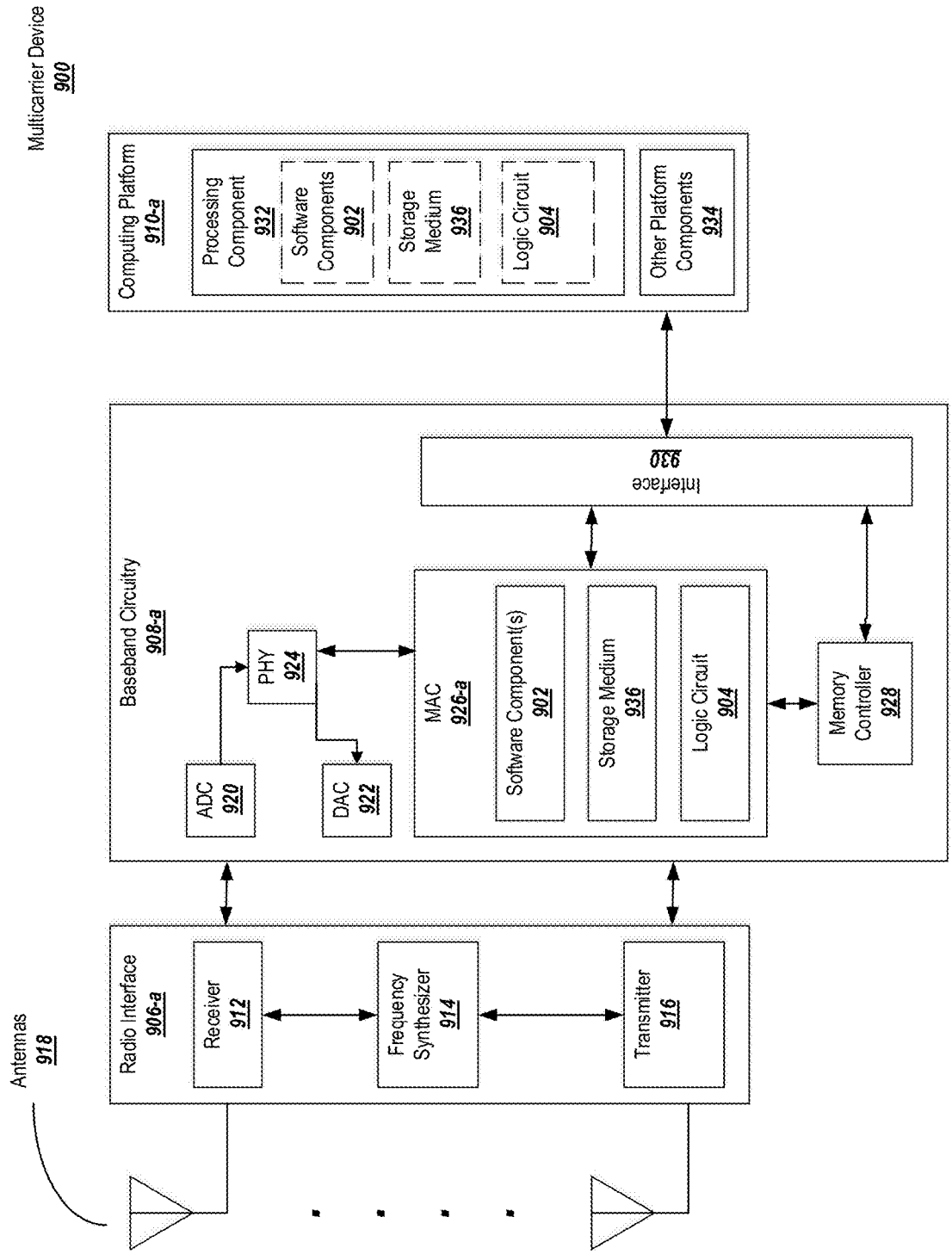
FIG. 9 is a block diagram depicting an exemplary multicarrier communications device.

FIG. 9 illustrates an embodiment of a device 900 for use in a multicarrier OFDM system, such as the messaging system 500. The device 900 may implement, for example, software components 902 as described with reference to the messaging component logic 600, the intent determination logic 700, and the group selection logic 800. The device 900 may also implement a logic circuit 904. The logic circuit 904 may include physical circuits to perform operations described for the messaging system 600. As shown in FIG. 9, device 900 may include a radio interface 906, baseband circuitry 908, and a computing platform 910, although embodiments are not limited to this configuration.

The device 900 may implement some or all of the structure and/or operations for the messaging system 500 and/or logic circuit 904 in a single computing entity, such as entirely within a single device. Alternatively, the device 900 may distribute portions of the structure and/or operations for the messaging system 600 and/or logic circuit 904 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 906 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio interface 906 may include, for example, a receiver 912, a transmitter 914 and/or a frequency synthesizer 916. The radio interface 906 may include bias controls, a crystal oscillator and/or one or more antennas 918. In another embodiment, the radio interface 906 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 908 may communicate with the radio interface 906 to process receive and/or transmit signals and may include, for example, an analog-to-digital converter 920 for down converting received signals, and a digital-to-analog converter 922 for up-converting signals for transmission. Further, the baseband circuitry 908 may include a baseband or physical layer (PHY) processing circuit 924 for PHY link layer processing of respective receive/transmit signals. The baseband circuitry 908 may include, for example, a processing circuit 926 for medium access control (MAC)/data link layer processing. The baseband circuitry 908 may include a memory controller 928 for communicating with the processing circuit 926 and/or a computing platform 910, for example, via one or more interfaces 930.

In some embodiments, the PHY processing circuit 924 may include a frame construction and/or detection module, in combination with additional circuitry such as a buffer memory, to construct and/or deconstruct communication frames, such as radio frames. Alternatively or in addition, the MAC processing circuit 926 may share processing for certain of these functions or perform these processes independent of the PHY processing circuit 924. In some embodiments, MAC and PHY processing may be integrated into a single circuit.

The computing platform 910 may provide computing functionality for the device 900. As shown, the computing platform 910 may include a processing component 932. In addition to, or alternatively of, the baseband circuitry 908, the device 900 may execute processing operations or logic for the messaging system 500 and logic circuit 904 using the processing component 932. The processing component 932 (and/or the PHY 924 and/or MAC 926) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 910 may further include other platform components 934. Other platform components 934 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 900 described herein, may be included or omitted in various embodiments of the device 900, as suitably desired. In some embodiments, the device 900 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 900 may be implemented using single input single output (SISO) architectures. However, certain implementations may include multiple antennas (e.g., antennas 918) for transmission and/or reception using adaptive antenna techniques for beamforming or spatial division multiple access (SDMA) and/or using MIMO communication techniques.

The components and features of the device 900 may be implemented using any combination of discrete circuitry, application specific integrated circuits (ASICs), logic gates and/or single chip architectures. Further, the features of the device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 936 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising:
receiving an input relating to a messaging bot request;
identifying a plurality of candidate bots associated with the messaging bot request;
filtering the plurality of candidate bots based on one or more filtering metrics;
ranking the filtered bots based on ranking metrics including at least a retention rate and an engagement rate of the filtered bots;
selecting a predetermined number of top-ranked bots, at least a first portion of the predetermined number being a predefined number of top-ranked bots associated with the retention rate and a second portion of the predetermined number being a predefined number of top-ranked bots associated with the engagement rate; and
returning a list of the selected top-ranked bots in response to the input, and
the retention rate defining a number of users returning to interact with the filtered bots after previous interactions over a predetermined time period, and
the engagement rate defining a measurement of how much or often the filtered bots respond to user queries.

2. The method of claim 1, wherein the ranking is performed separately for the retention rate and the engagement rate and top bots in each category are returned.

3. The method of claim 1, at least one metric configured to serve as both a filtering metric and a ranking metric.

4. The method of claim 1, wherein the input is a request to search for bots, or a task to be performed by a bot.

5. The method of claim 1, wherein at least one of the candidate bots is associated with a page in a social network, and the filtering metrics include a block rate of the page, a popularity of the page among users of the social network, previous interactions of a user associated with the input with the page, social signals from friends of the user associated with the input, a response rate of the candidate bot, whether the candidate bot is correctly configured, or a language spoken by the candidate bot.

6. The method of claim 1, wherein at least one of the candidate bots is associated with a page in a social network, and the ranking metrics include the retention rate of the candidate bot, a block rate of the page, a number of messages sent or received by the candidate bot, a popularity of the page among users of the social network, a response rate of the candidate bot, a fan count of the bot or the page, a number of followers of the page, and pixel activity associated with the user and the page.

7. The method of claim 1, wherein at least one of the ranking metrics is adjusted based on a context, the context including one or more of a category of a page associated with the bot, an age of a user associated with the input, a gender of the user, an interest of the user, a time of day, or a seasonality.

8. A non-transitory computer-readable medium storing instructions configured to cause one or more processors to:
receive an input relating to a messaging bot request;
identify a plurality of candidate bots associated with the messaging bot request;
filter the plurality of candidate bots based on one or more filtering metrics;
rank the filtered bots based on ranking metrics including at least a retention rate and an engagement rate of the filtered bots;
select a predetermined number of top-ranked bots, at least a first portion of the predetermined number being a predefined number of top-ranked bots associated with the retention rate and a second portion of the predetermined number being a predefined number of top-ranked bots associated with the engagement rate; and return a list of the selected top-ranked bots in response to the input, and the retention rate defining a number of users returning to interact with the filtered bots after previous interactions over a predetermined time period, and the engagement rate defining a measurement of how much or often the filtered bots respond to user queries.

9. The computer-readable medium of claim 8, wherein the ranking is performed separately for the retention rate and the engagement rate and top bots in each category are returned.

10. The computer-readable medium of claim 8, at least one metric configured to serve as both a filtering metric and a ranking metric.

11. The computer-readable medium of claim 8, wherein the input is a request to search for bots, or a task to be performed by a bot.

12. The computer-readable medium of claim 8, wherein at least one of the candidate bots is associated with a page in a social network, and the filtering metrics include a block rate of the page, a popularity of the page among users of the social network, previous interactions of a user associated with the input with the page, social signals from friends of the user associated with the input, a response rate of the candidate bot, whether the candidate bot is correctly configured, or a language spoken by the candidate bot.

13. The computer-readable medium of claim 8, wherein at least one of the candidate bots is associated with a page in a social network, and the ranking metrics include the retention rate of the candidate bot, a block rate of the page, a number of messages sent or received by the candidate bot, a popularity of the page among users of the social network, a response rate of the candidate bot, a fan count of the bot or the page, a number of followers of the page, and pixel activity associated with the user and the page.

14. The computer-readable medium of claim 8, wherein at least one of the ranking metrics is adjusted based on a context, the context including one or more of a category of a page associated with the bot, an age of a user associated with the input, a gender of the user, an interest of the user, a time of day, or a seasonality.

15. An apparatus comprising:
a non-transitory computer readable medium storing instructions for performing a bot search; and
a processor configured to execute the instructions to cause the processor to:
receive an input relating to a messaging bot request;
identify a plurality of candidate bots associated with the messaging bot request
filter the plurality of candidate bots based on one or more filtering metrics;
rank the filtered bots based ranking metrics including at least a retention rate and an engagement rate of the filtered bots;
select a predetermined number of top-ranked bots, at least a first portion of the predetermined number being a predefined number of top-ranked bots associated with the retention rate and a second portion of the predetermined number being a predefined number of top-ranked bots associated with the engagement rate; and
return a list of the selected top-ranked bots in response to the input, and
the retention rate defining a number of users returning to interact with the filtered bots after previous interactions over a predetermined time period, and
the engagement rate defining a measurement of how much or often the filtered bots respond to user queries.

16. The apparatus of claim 15, wherein the ranking is performed separately for the retention rate and the engagement rate and top bots in each category are returned.

17. The apparatus of claim 15, at least one metric configured to serve as both a filtering metric and a ranking metric.

18. The apparatus of claim 15, wherein the input is a request to search for bots, or a task to be performed by a bot.

19. The apparatus of claim 15, wherein at least one of the candidate bots is associated with a page in a social network, and the filtering metrics include a block rate of the page, a popularity of the page among users of the social network, previous interactions of a user associated with the input with the page, social signals from friends of the user associated with the input, a response rate of the candidate bot, whether the candidate bot is correctly configured, or a language spoken by the candidate bot.

20. The apparatus of claim 15, wherein at least one of the candidate bots is associated with a page in a social network, and the ranking metrics include the retention rate of the candidate bot, a block rate of the page, a number of messages sent or received by the candidate bot, a popularity of the page among users of the social network, a response rate of the candidate bot, a fan count of the bot or the page, a number of followers of the page, and pixel activity associated with the user and the page.

* * * * *